(No Model.)
M. P. DENNEY.
COMBINED HAY RAKE AND TEDDER.
No. 349,928. Patented Sept. 28, 1886.
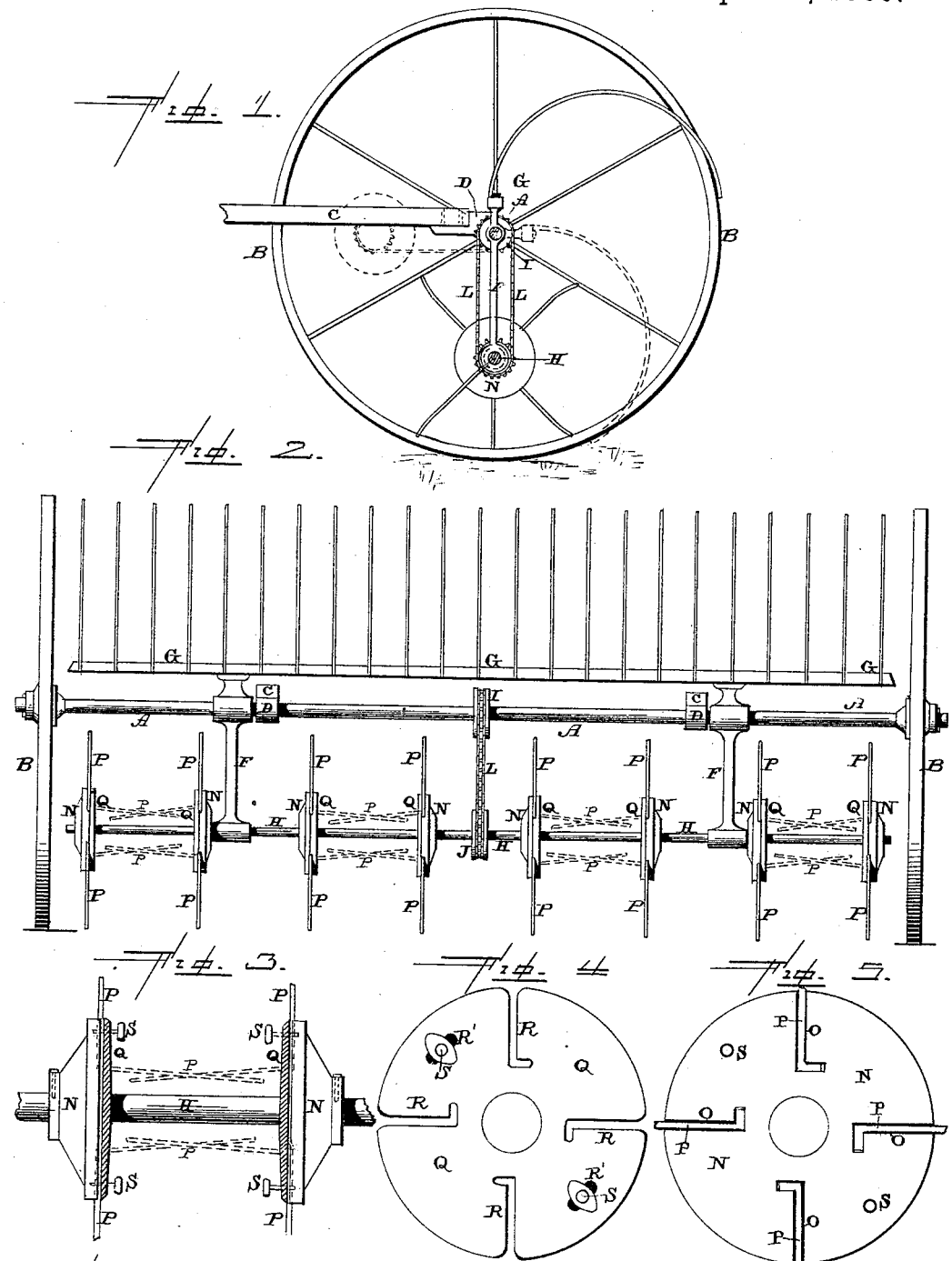

UNITED STATES PATENT OFFICE.

MIFFLIN P. DENNEY, OF NEW YORK, N. Y.

COMBINED HAY RAKE AND TEDDER.

SPECIFICATION forming part of Letters Patent No. 349,928, dated September 28, 1886.

Application filed September 9, 1885. Serial No. 176,579. (No model.)

*To all whom it may concern:*

Be it known that I, MIFFLIN P. DENNEY, of New York city, in the county of New York and State of New York, have invented certain new and useful Improvements in a Combined Hay Rake and Tedder; and I do hereby declare the following to be a full, clear, and exact description of the invention, such as will enable others skilled in the art to which it pertains to make and use it, reference being had to the accompanying drawings, which form part of this specification.

My invention relates to an improvement in a combined hay rake and tedder; and it consists in, first, the combination of the rake, the tedder, and suitable arms or castings, which are pivoted upon the axle, and which unite the rake and tedder-shaft together, whereby when the rake-teeth are lowered the tedder is raised and when the tedder is lowered the rake-teeth are raised out of contact with the ground; second, in a combined hay rake and tedder, the combination of the axle, the arms or castings placed thereon, the rake-head rigidly secured to one end of the arms, and the tedder-shaft journaled in the opposite ends from the rake-head, the arms being adapted to turn upon the axle so as to bring either the rake or the tedder into operation; third, the combination of the two tedder-heads, which are adjustable in relation to each other, and provided with suitable grooves and slots, so that the tedder-teeth can be moved into a horizontal position, all of which will be more fully described.

The object of my invention is to connect the rake-head and tedder together at opposite ends of rods or castings which are pivoted upon the axle, so that when either the rake or tedder is brought into use the other will be raised above the ground, and thus the tedder is made to counterbalance the rake, so as to make it easier to dump, to close the teeth of the tedder down upon the tedder-shaft, so that they will not be in the way while the tedder is not in use.

Figure 1 is a vertical section of a machine embodying my invention. Fig. 2 is a rear elevation of the same. Figs. 3, 4, and 5 are detail views of the tedder.

A represents the axle, and B the ground-wheels, one of which is secured rigidly to the axle, while the other revolves loosely thereon in the usual manner.

Secured to the inner ends of the thills C are the boxes D, in which the shaft A revolves.

Journaled upon the axle at any suitable distance apart are any desired number of arms or extensions, F, which have the rake-head G rigidly secured to one end and the tedder-shaft H journaled in the other. The ends which carry the tedder-shaft are made longer than those which carry the rake, for the reason that the rake-teeth are made long enough to touch the ground when the arms or castings F are turned into the position shown in dotted lines in Fig. 1, and because the tedder-teeth are much shorter than the rake-teeth. The rake and the tedder being secured to opposite ends of the arms or castings F, which are journaled upon the axle A, the tedder serves as a counter-balance for the rake, so as to cause the rake to be dumped more readily and easily than where no counter-balance is used. No devices are here shown for locking the rake down in position while in use, and no levers or devices are shown for dumping the rake-teeth, for this forms no special part of this invention. The rake may be dumped either by hand or by any mechanism connected with the wheels or other moving part of the machine, as may be desired. The rake, being counterbalanced by the tedder, is made especially easy to be dumped by hand. The rake and tedder being connected together, as here shown, when the rake is brought into use, the tedder is raised into the position shown in dotted lines in Fig. 1, and when the tedder is brought into use the rake-teeth are raised above the axle, as shown. This construction of parts makes the machine very cheap and simple and very easily operated. Secured to the axle at any suitable point is a toothed wheel, I, and upon the tedder-shaft H is secured a second wheel, J, but which is larger than the one I, because the tedder-shaft H is to be made to revolve more slowly than the axle. Around these two wheels, I J, both of which are flanged, as shown, is passed a chain, L, which serves to communicate the motion of the axle to the shaft H. This chain L may be made slack enough to throw it off of either one or both of the wheels, so as to prevent the tedder-shaft from revolving when the tedder is not in use. The tedder-shaft H is to be made to revolve more slowly than the axle for the purpose of causing the teeth of the tedder to slightly drag upon the ground, and thus to draw the hay forward and upward as the machine is drawn along.

Secured to the tedder-shaft H at suitable distances apart, and by means of set-screws or other holding devices, are the heads N, which have a number of L-shaped grooves, O, made in their inner sides, as shown in Fig. 5. These grooves serve to receive the tedder-teeth P, which are held rigidly in position by means of the clamping-plates Q, which are provided with the slots R', and which are secured to the heads N by means of the set-screws S. The inner ends of the teeth P are made L-shaped, as shown in Fig. 5, so as to correspond to the shape of the recesses O, in which they are held. The inner bent end of each tooth serves as a pivot or bearing upon which the tooth turns when turned down to a horizontal position, as shown by dotted lines. These plates Q also have slots R formed in them, as shown in Fig. 4, and which slots can be moved into line with the grooves O made in the heads N. These clamping-plates Q have a turning movement upon the shaft H equal to the length of the slots R', for the purpose of moving the slots R, out of line with the recesses O.

The operation is as follows: When the teeth P are to be brought into use, they are inserted in the recesses O in the heads N, and the clamping-plates are then turned so as to move the slots R out of line with the grooves O. The tedder-teeth are thus locked rigidly in position, and have no movement whatever. When the tedder is to be thrown out of use, the set-screws S are loosened and the plates Q are turned upon the axle just far enough to bring the slots R in line with the grooves O, when the teeth can be turned down into a horizontal position, as shown in dotted lines. By turning the plates Q backward the ends of the teeth will be clamped tightly in the inner ends of the recesses O, so as to prevent them from getting out of place. The inner L-shaped portions of the slots R are made shorter than the corresponding portions of the recesses O, and hence when the slots and grooves are in line with each other the shorter portions of the slots prevent the teeth from pulling out. Where the slots R are in line with the grooves O the teeth P may be detached from the heads N without having to remove the clamping-plates Q. When, however, the slots and grooves are out of line with each other, the teeth are rigidly held and cannot be removed. By means of this construction the tedder-teeth can be turned down into line with the tedder-shaft, and hence will not be in the way while the tedder is not in operation, as they would be when the tedder-shaft is turned upward under the thills, as shown in Fig. 1.

Having thus described my invention, I claim—

1. In a combined hay rake and tedder, the combination of the axle, arms or castings pivoted thereon, and which have their ends to project beyond opposite sides of the axle in a straight line with each other, the hay-rake secured to one end of the arms and the tedder secured to the other, substantially as shown.

2. In a combined hay rake and tedder, the combination of the rake, the tedder, a suitable casting or arm for connecting the two together, the casting or arm being pivoted upon the axle, so that when either rake or tedder is brought into use the other is raised up out of contact with the ground, substantially as described.

3. In a combined hay rake and tedder, the combination of the axle, the arms or castings F, placed thereon, the rake-head rigidly secured to one end of the arms, and the tedder-shaft journaled in the opposite ends of the arms from the rake-head, the arms being adapted to turn upon the axle so as to bring either the rake or the tedder into operation, substantially as shown.

4. The combination of the tedder-shaft, the heads provided with L-shaped grooves, the teeth, and the clamping-plates Q, movable on the shaft and provided with L-shaped slots, substantially as set forth.

In testimony whereof I affix my signature in presence of two witnesses.

MIFFLIN P. DENNEY.

Witnesses:
CHARLES HESTON,
IRVING N. STARRETT.